P. PAVLIDÉS.
TURBINE SET.
APPLICATION FILED SEPT. 12, 1916.

1,274,320.

Patented July 30, 1918.
2 SHEETS—SHEET 1.

Inventor:
Paul Pavlidés

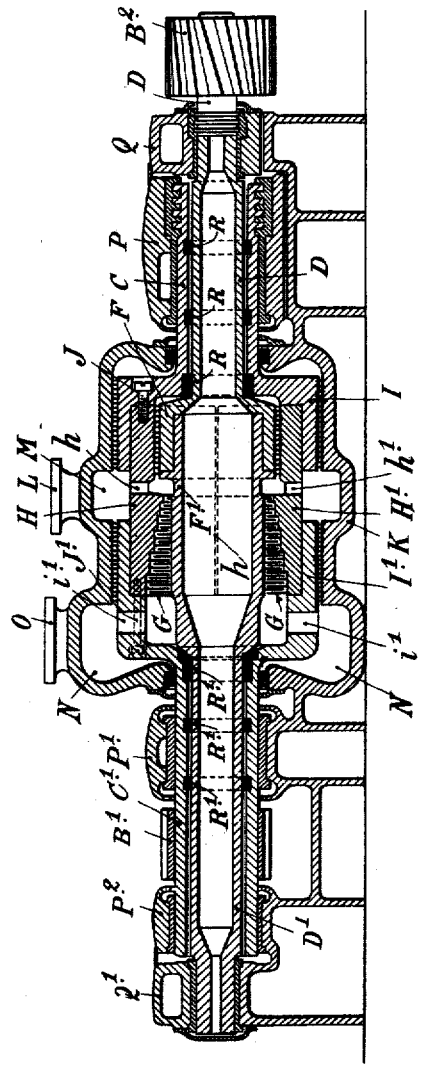

UNITED STATES PATENT OFFICE.

PAUL PAVLIDÉS, OF PARIS, FRANCE.

TURBINE SET.

1,274,320.   Specification of Letters Patent.   Patented July 30, 1918.

Application filed September 12, 1916. Serial No. 119,734.

*To all whom it may concern:*

Be it known that I, PAUL PAVLIDÉS, subject of Greece, residing at 39 Avenue de l'Opéra, à Paris, France, have invented certain new and useful Improvements in Turbine Sets for Marine and other Purposes, of which the following is a specification.

The object aimed at in this invention is the attainment, particularly for the propulsion of ships, of a turbine set capable of insuring, at a given consumption, better results both as regards space and weight than those obtained in present installations of turbine machinery.

To this end, the invention comprises, on the one hand, a special set composed of two coupled rotor wheels, one internal, one other external, running in opposite directions on the same shaft.

In conformity with this invention, the problem of employing the power developed as directly as possible, and at the same time insuring perfect balancing, is solved by placing the propeller shaft between two coupled rotor wheel turbines, one high pressure, the other low, the coupling between the common collecting shaft and the two turbines,—which are arranged symmetrically in relation to the axis of the shaft—being obtained by helicoidal gearing. A helicoidal toothed wheel and an internal helicoidally toothed crown fixed on the (collecting) shaft collect in this way the power developed by the two external rotors and the two internal rotors respectively, by direct gearing with helicoidal pinions fixed respectively on the corresponding rotor shafts. As will be seen, this arrangement not only has the advantage of reducing to a minimum the organs of transmission between the two rotors and the single collecting shaft, since the reduced gearings which transmit the movements of the two rotors of one turbine serve as mechanical coupling organs between these rotors; but also the further advantage of contributing to insure, through the organs of transmission themselves, that perfect transversal and longitudinal balancing which is indispensable for the proper working of the whole.

Fig. 2 is a longitudinal flow section, on the largest scale, of the H. P. turbine.

Figure 1:
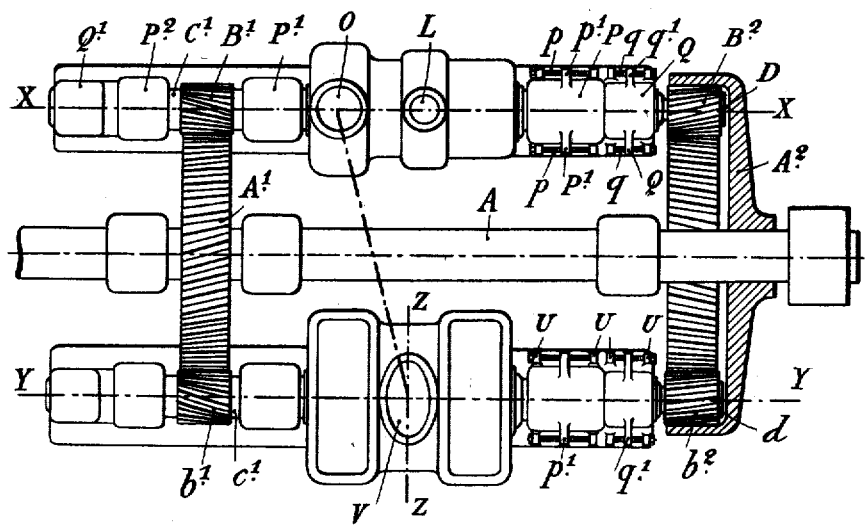
Figure 1 is a plan of the two coupled rotor turbines combined, grouped by means of the special inverted helicoidal gear coupling, with the main propeller shaft arranged between them.

In Fig. 1 A indicates the collecting shaft, a propeller shaft for example, in relation to which are symmetrically arranged the geometrical axes X—X and Y—Y of a H. P. and a L. P. turbine, with coupled rotors turning in opposite directions. A helicoidal toothed wheel for transmission from a higher to lower speed $A^1$ collects the power developed by the two external rotors, by means of gearing adapted for this purpose connected with two helicoidal pinions $B^1$ and $b^1$ fixed respectively on shaft $C^1$ of the external rotor of the H. P. turbine and on the shaft $c^1$ of the external rotor of the L. P. turbine. Two pinions ($B^2$, $b^2$) similar to pinions ($B^1$ and $b^1$), that is to say, of the same diameter and with the same worm gear, but with opposite pitch to that of $B^1$ and $b^1$, are fixed respectively on shaft D of the internal rotor of the H. P. turbine and on the shaft $d$ of the internal rotor of the L. P. turbine. The power developed by these two internal rotors is collected by an internally toothed wheel $A^2$ fixed on shaft A.

It will easily be seen that in this grouping the toothed wheels $A^1$, $A^2$ of the collecting shaft A insure, by themselves alone, the mechanical junction between the transmission pinions of the two turbines, and thus automatically distribute the load between these pinions.

I claim:

The combination with a single driven shaft, such as a propeller shaft, of two similar turbines of the axial type, a high-pressure and a low-pressure turbine, having each an external and an internal rotor, revolving in opposite directions, the turbine shafts being arranged parallel to and symmetrically on either side of the said driven shaft, two helicoidal speed-reducing gear wheels one with external and the other with internal gearing mounted on the said driven shaft, and two corresponding helicoidal toothed wheels respectively mounted on the shafts of the two external rotors and on the shafts of the internal rotors in mesh with said speed reducing gear wheels.

In testimony whereof I affix my signature in presence of two witnesses.

PAUL PAVLIDÉS.

Witnesses:
HENRI MONIN,
CHAS. P. PRESSLY.